Figure 1:
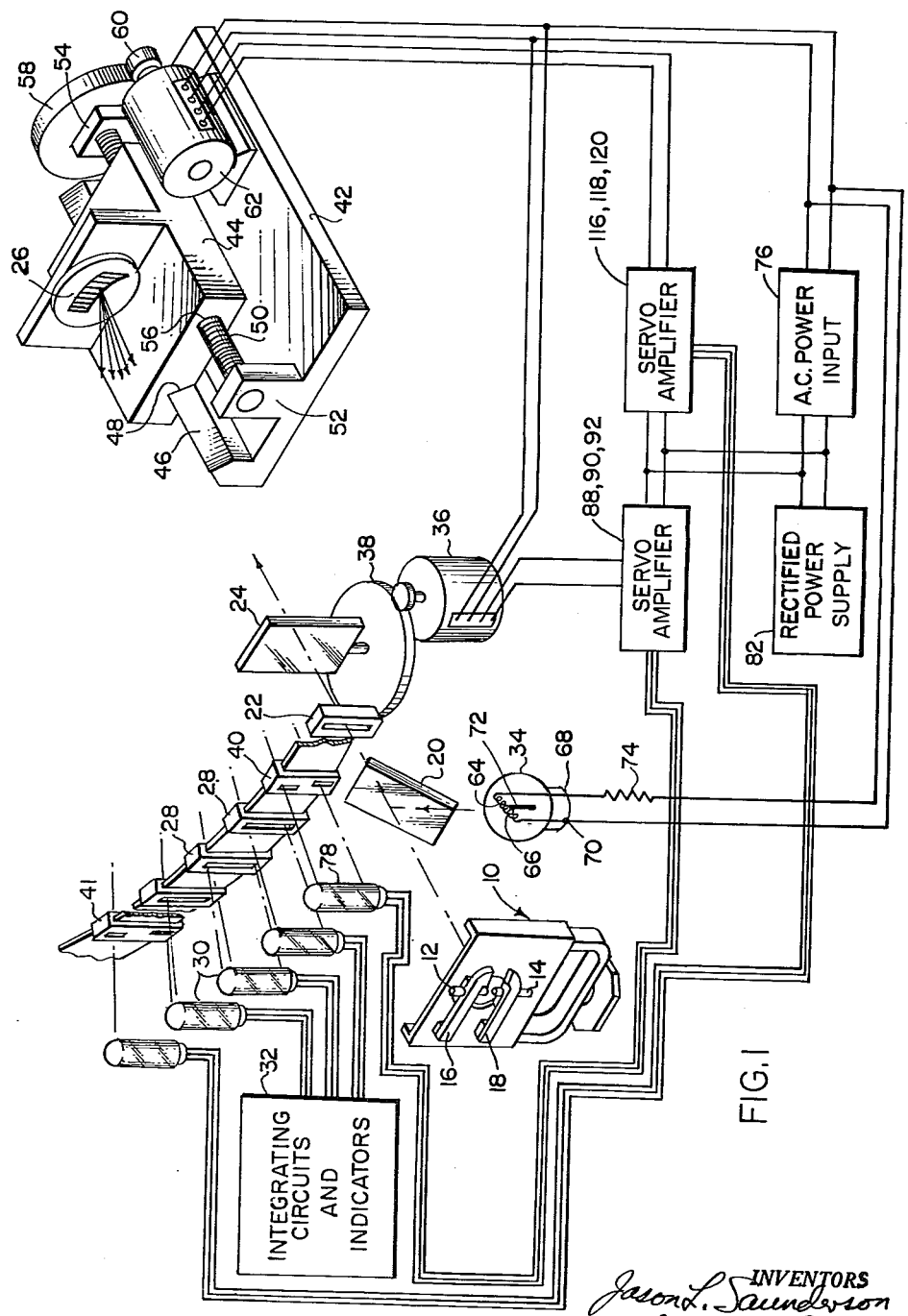

3,064,520
SPECTROSCOPIC APPARATUS
Jason L. Saunderson, Lexington, and Eliot Du Bois, Lincoln, Mass., assignors to Baird-Atomic, Inc., Cambridge, Mass., a corporation of Massachusetts
Filed Oct. 27, 1960, Ser. No. 65,526
8 Claims. (Cl. 88—14)

The present invention relates to spectrum analysis and, more particularly, to spectrometers of the so-called "direct reading" type which automatically indicate the chemical composition of a specimen by determining the intensity distribution of radiation of characteristic wavelengths emitted by the specimen under excitation.

By way of example, a typical direct reading spectrometer comprises an entrance slit that transmits radiation from an electrically excited specimen, a curved diffraction grating that forms a spectrum from radiation so transmitted, and a plurality of exit slits that transmit radiation of preselected wavelengths to photocells in order to determine the differing intensities at these wavelengths. In such a spectrometer, the spacial relationships among the entrance slits, the grating and the exit slits are so critical that minor changes in ambient temperature, for example, may cause their misalignment and, in consequence, a spectrum shift capable of introducing errors into the determination of the intensities.

It has been proposed that the automatic correction of any such misalignment be effected by an automatic servo system that is photoelectrically controlled by what may be termed "monitor radiation." Such monitor radiation, in one form, is generated by a source that is distinct from the source of specimen radiation and, in another form, is a component of the specimen radiation. The operation is such that misalignment among the grating and the entrance and exit slits for the radiation under analysis is accompanied inherently by analogous misalignment among the grating and the entrance and exit slits for the component of monitor radiation. The servo system for maintaining predetermined positions of the grating and the entrance and exit slits is responsive to the instantaneous orientation of the monitor radiation. Such systems are shown in Patent No. 2,837,959, issued on June 10, 1958, for "Automatic Spectrometer Apparatus and Method" and Patent No. 2,937,561, issued on May 24, 1960, for "Spectroscopic Apparatus," both in the names of Jason L. Saunderson and Eliot Du Bois.

A possible limitation of an automatic servo system of the type described above is that theoretically it is capable of controlling the positioning of only a single portion of the spectrum. The reason for this is that this servo system is not capable of sensing and counteracting any significant change in the dispersion of the spectrum lines such as exists, for example, not because of a minor disorientation of the grating but rather because of a minor change in the geometry of the grating. In consequence of such a change in dispersion, although chosen spectrum lines will be maintained in registration with their exit slits, other spectrum lines, far removed from these chosen spectrum lines, will tend to be out of registration with their exit slits. Although such a significant change in dispersion can occur only under extreme temperature or pressure change or physical deformation, very precise work may require extreme stability calling for compensation for such a change in dispersion.

The object of the present invention is to compensate for such changes in dispersion by at least a second servo system cooperating with a first servo system of the aforementioned type. The two servo systems make two corrections, one for spectrum orientation and the other for spectrum dispersion. More specifically, the orientation correction may be made by any of the techniques heretofore suggested for use in a servo system of the foregoing type, i.e. movable entrance slit, rotating deflection plate, rotatable grating mount, etc., and the dispersion correction may be made by relatively reciprocating the grating and the focal curve. In practice, it is preferable to employ the short wavelength monitor radiation for position correction and the long wavelength monitor radiation for dispersion correction since generally long wavelength radiation will be dispersed more than short wavelength radiation. However, the reverse arrangement and other more complex arrangements are feasible. In one system, the central image line is used for position correction and an auxiliary monitor line for dispersion correction.

Other objects of the present invention will in part be obvious and will in part appear hereinafter.

The invention accordingly comprises the apparatus possessing the features, properties and relation of components that are exemplified in the following detailed disclosure, the scope of which will be indicated in the appended claims.

Figure 2:
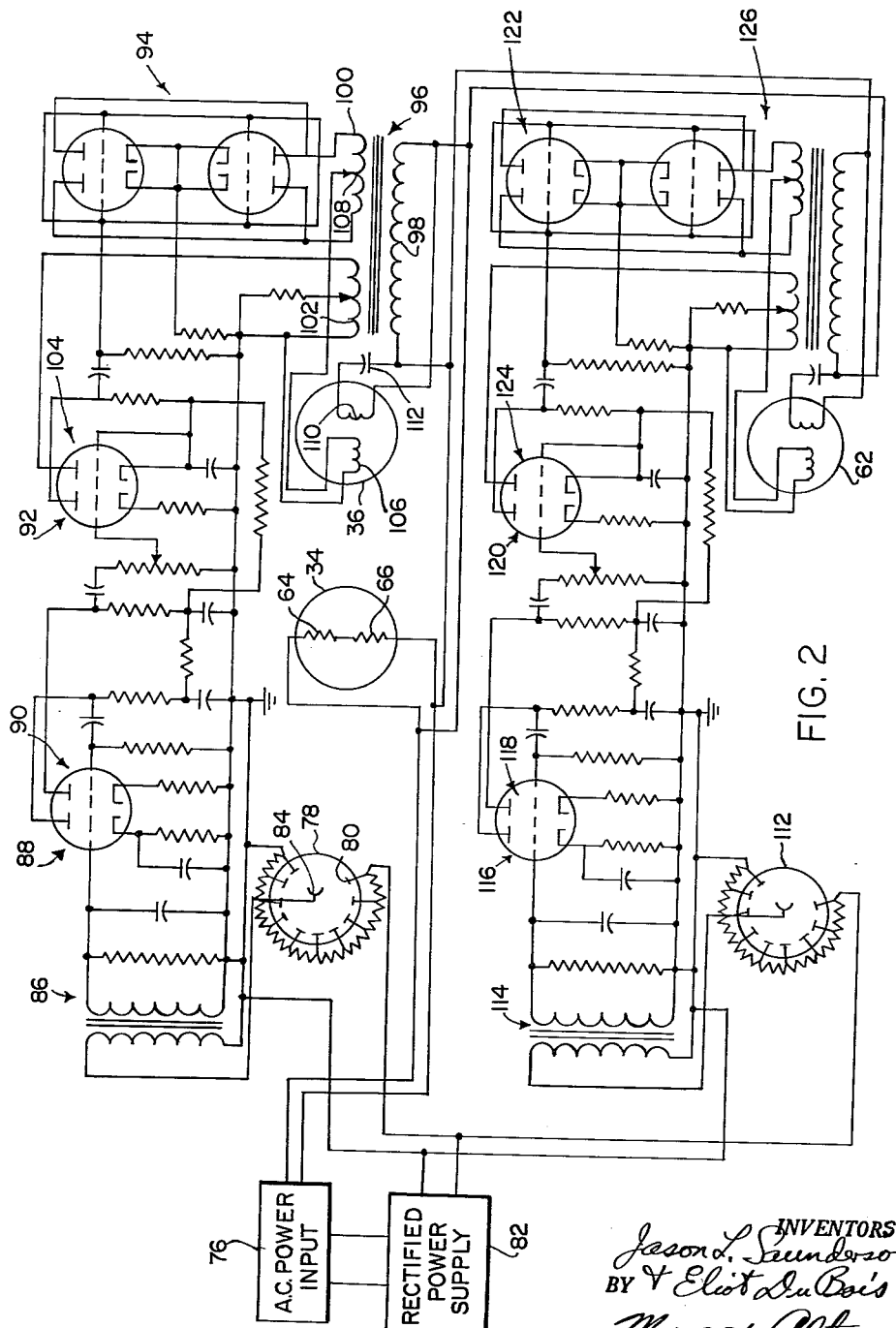

For a fuller understanding of the nature and objects of the present invention, reference should be had to the following detailed description, taken in connection with the accompanying drawings wherein:

FIG. 1 is a perspective, schematic view of significant components, partly in perspective and partly in block, of a spectrometer embodying the present invention, these components normally being enclosed within a light tight housing (not shown); and FIG. 2 is a schematic electrical diagram of a servo system incorporating the components of FIG. 1.

The mechanical components of the spectrometer of FIGS. 1 and 2 are shown generally in FIG. 1. These components in operation are enclosed within a housing that shields its interior from ambient radiation capable of affecting the system now to be described. This system serves to indicate the chemical composition of a specimen by determining the intensity distribution, at selected wavelengths, of radiation emitted by the specimen under excitation in an arc mount assembly 10. In conventional fashion, arc mount assembly 10 includes a pair of electrodes 12 and 14, for example, in the form of two pins composed of the specimen material. Electrodes 12 and 14 are retained in predetermined relative axial positions by a pair of clamps 16 and 18. Associated with arc mount assembly 10 is a circuit (not shown) for generating a suitable voltage across the gap between the inner ends of electrodes 12 and 14 in order to produce an electrical discharge. The resulting specimen radiation is transmitted through a partially transmitting, partially reflecting oblique plate 20, an entrance slit 22 and a rotatable deflection plate 24 onto a concave diffraction grating 26 in order to produce a spectrum. Preselected portions (which may be thought of loosely as preselected lines) of this spectrum are directed through respective exit slits 28 to respective photomultiplier tubes 30. The intensities of these spectrum lines are indicated by these photomultiplier tubes in association with appropriate integrating circuits 32.

In order to minimize even slight disturbances of the spacial relationships among the various components, they are mounted on a sturdy A-frame (not shown) having intersecting longitudinal legs and short cross pieces constructed from heavy gauge channel stock. Nevertheless, because of the relatively great distance between the grating at one end of the A-frame and the entrance and exit slits at the other end, temperature and pressure changes tend to disorient the grating with respect to the entrance and exit slits and tend to change the dispersion of the spectrum lines relative to each other. In consequence, all of the spectrum lines may be shifted from reigstration with their exit slits and the spacing of the spectrum lines may be altered in such a way as to make their registration with the fixed exit slits impossible. In accordance with the present invention, proper position and proper dispersion are ensured by the cooperating automatic servo systems now to be described.

These servo systems are photoelectrically controlled by monitor radiation in the form of first and second wavelengths of monitor radiation that are produced by a gas discharge tube 34. These two wavelengths are selected from the multitude of wavelengths produced by the gas, e.g. mercury, enclosed within the envelope of gas discharge tube 34. These two wavelengths are directed toward oblique plate 20 from which they are reflected through entrance slit 22 toward grating 26. By virtue of the dispersion produced by grating 26, these two wavelenghts of monitor radiation are directed respectively to an orientation servo system associated with exit slits 40 and a dispersion servo system associated with exit slits 41.

The orientation servo system includes a servo motor 36 and a gear train 38 for continuously controlling the orientation of deflection plate 24, which determines the apparent position of the entrance slit and, consequently the alignment of the first monitor wavelength with monitor exit slits 40 to be described below.

The dispersion servo system includes a base plate 42 that is fixed with respect to source 34 and a mount 44 that carries grating 26. Base 42 is provided with a tongue 46 and mount 44 is provided with a groove 48. The tongue and groove are slidably mated in such a way that the mount may be reciprocated precisely by means of a rotatable screw 50. The opposite ends of screw 50 are journaled in a pair of brackets 52 and 54, which are affixed to base 42. Screw 50 turns in a tapped bore 56 extending through mount 44. At one end of screw 50 is keyed a gear 58 that is rotated through a pinion 60 by a servo motor 62. The arrangement is such that mount 44 rides along tongue 46 in one direction or the other in response to rotation of servo motor 62. Since the first monitor wavelength is fixed on exit slits 40 by the orientation servo system, the second monitor wavelength may be fixed on exit slits 41 by reciprocation of grating 26 in response to the dispersion servo system.

Tube 34, which contains mercury, possesses first and second filaments 64 and 66. These filaments are connected in series across a pair of terminals 68 and 70 and are centrally supported at their junction by a rod 72. An alternating voltage applied across the filaments in series produces instantaneous differences in potential between the filaments. At any instant if the difference is great enough, the mercury breaks down to create an electron flow in parallel with the connection between the filaments. This electron flow gives rise to a glow in the vicinity of the instantaneous cathode. Gas discharge tubes of various other designs may be employed alternatively, it being only necessary that their vapor pressure and mechanical construction be adjusted to give rise to alternate sources of radiation when sujected to appropriate alternating voltage. As shown, this alternating voltage is supplied through a ballast resistor 74 from power supply 76. Thus two wavelengths of monitor radiation are utilized, each including two components of alternating intensity.

The two components of the first monitor wavelength are directed through entrance slit 22 to grating 26, which diffracts them respectively to slits 40 which are displaced from each other in height and are offset from each other transversely. Since these slits are offset, there is one orientation at which the amount of radiation directed through the upper slit is exactly equal to the amount directed through the lower slit. In another orientation, either the radiation transmitted through the lower slit or the radiation transmitted through the upper slit will be greater in intensity. Photomultiplier tube 78 (FIG. 2) which is associated with exit slits 40 (FIG. 1), includes dynodes 80, under steady voltages applied by a rectified power supply 82, and a collector anode 84. In response to the two components of the first monitor wavelength, photomultiplier tube 78 generates a succession of electrical pulses which are equal in magnitude when the rays are properly oriented. Collector anode 84 is connected through an input transformer 86 to three amplifiers 88, 90 and 92 and a push-pull power stage 94. These stages are energized by power supply 76 through a transformer 96 having a primary winding 98 and a pair of secondary windings 100 and 102. Secondary winding 102 supplies a rectifier stage 104 that polarizes the amplifier and power stages. One winding 106 of servo motor 36, which is of the split phase induction type, is connected between an appropriate intermediate point 108 of secondary winding 100 and ground. The other winding 110 is connected to power supply 76 through a capacitor 112 which shifts the wave form in winding 110 to 90° out-of-phase relationship with respect to the wave form in winding 106. The operation of the circuit is such that when the alternative pulses generated by photomultiplier tube 78 are unequal in magnitude, a similar inequality will exist in the wave form of winding 106 and the pulses of greater amplitude will correspond with either the positive or negative half cycles of the power input wave form. Because the wave form in winding 106 is 90° out-of-phase with respect to the power input wave form, the rotor of servo motor 36 will rotate. The direction of rotation will be determined by whether the pulse of greater amplitude in winding 106 coincides with the positive or negative half cycle of the power input wave form. This direction thus is determined by whether the beam transmitted through the upper or lower one of exit slits 40 is of the greater intensity. In consequence of the foregoing, plate 24 is continually oriented to maintain a predetermined orientation of the beams directed toward specimen radiation exit slits 28.

The two components of the second monitor wavelength are directed through entrance slit 22 to grating 26, which diffracts them respectively to slits 41 which are displaced from each other in height and are offset from each other transversely and which operate like slits 40 discussed above. Associated with slits 41 is a photomultipler tube 112 which is a component of the servo system associated with servo motor 62. This servo system includes an input transformer 114, amplifiers 116, 118 and 120, a push-pull power amplifier 122, a rectifier 124 and a transformer arrangement 126, all similar to their counterparts in the servo system of servo motor 36. In consequence of the foregoing, mount 44 is continuously reciprocated to maintain a predetermined dispersion of the specimen radiation beams at exit slits 28.

It will be understood that although the present system includes two servo systems, more than two servo systems are feasible. Thus, for example, a pair of offset slits could be used at the center of the dispersion range as well as at opposite ends thereof. Since certain other changes may be made in the above device without departing from the scope of the invention herein involved, it is intended that all matter contained in the above description or shown in the accompanying drawings shall be interpreted in an illustrative and not in a limiting sense.

What is claimed:

1. Spectroscopic apparatus comprising source means for exciting a chemical sample to emit characteristic radiation, spectral means for dispersing said characteristic radiation into a spectrum, detection means for reading said spectrum, said source means, said spectral means and said detection means being subject to geometrical change with respect to each other, first means responsive to change of distance between components of said radiation from said spectral means to produce a signal, and second means responsive to said signal from said first means for controlling the distance between said spectral means and said detection means.

2. Spectroscopic apparatus comprising source means for exciting a chemical sample to emit characteristic radiation, spectral means for dispersing said characteristic radiation into a spectrum, detection means for reading said spectrum, said source means, said spectral means and said detection means being subject to change of orientation and distance with respect to each other, first servo means including a first element of said detection means responsive to change of direction of said radiation from said spectral means to produce a signal for controlling the relative orientations of said detection means and said characteristic radiation from said spectral means, and second servo means including a second element of said detection means responsive to change of distance between components of said radiation from said spectral means to produce a signal for controlling the distance between said spectral means and said detection means.

3. The spectroscopic apparatus of claim 2 wherein said second servo means includes a base and a carriage for reciprocating said spectral means on said base.

4. The spectroscopic apparatus of claim 2 wherein said second servo means includes a base and a carriage for slidably mounting said spectral means on said base.

5. The spectroscopic apparatus of claim 2 wherein said spectral means is a diffraction grating.

6. Spectroscopic apparatus comprising source means for exciting a chemical sample to emit characteristic radiation, spectral means for dispersing said characteristic radiation into a spectrum, detection means for reading said spectrum, said source means, said spectral means and said detection means being subject to change of orientation and distance with respect to each other, first servo means including a first element of said detection means responsive to change of direction of said radiation from said spectral means to produce a signal for controlling said orientations, and second servo means including a second element of said detection means responsive to change of separation at said detection means between components of said radiation from said spectral means to produce a signal for controlling said distance, said first servo means including a mechanism for varying the angular relationship between said spectral means and said detection means, said second servo means including a mechanism for varying the distance between said spectral means and said detection means.

7. The spectroscopic apparatus of claim 6 wherein said first servo means includes first exit slit means for receiving first monitor radiation from said spectral means and said second servo means includes second exit slit means for receiving second monitor radiation from said spectral means.

8. Spectroscopic apparatus comprising source means for exciting a chemical sample to emit characteristic radiation, grating means for diffracting said characteristic radiation into a spectrum, detection means for reading said spectrum, said source means, said grating means and said detection means being subject to change of orientation and distance with respect to each other, first servo means including a first element of said detection means responsive to change of direction of said radiation from said grating means to produce a signal for controlling the relative orientations of said detection means and said characteristic radiation from said grating means, and second servo means including a second element of said detection means responsive to change of distance between components of said radiation from said grating means to produce a signal for controlling the distance between said grating means and said detection means, said second servo means including a base and a carriage for reciprocating said grating means on said base.

References Cited in the file of this patent

UNITED STATES PATENTS

| | | |
|---|---|---|
| 2,837,959 | Saunderson et al. | June 10, 1958 |
| 2,937,561 | Saunderson et al. | May 24, 1960 |